(No Model.) 5 Sheets—Sheet 1.
W. A. COURTLAND.
BICYCLE.
No. 520,728. Patented May 29, 1894.
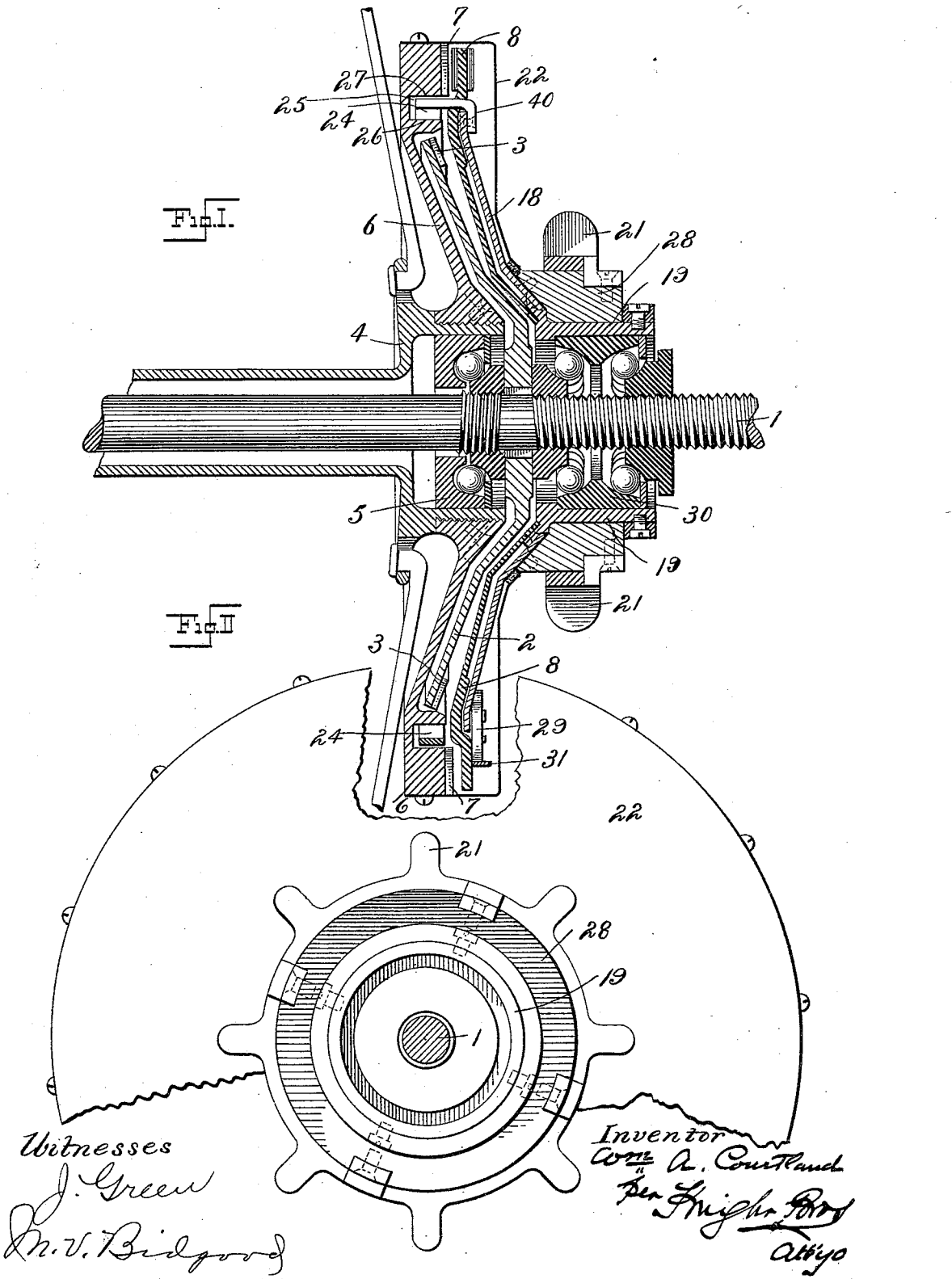
Witnesses
J. Green
M. V. Bidgood
Inventor
Wm A. Courtland
per Knight Bros
Atty

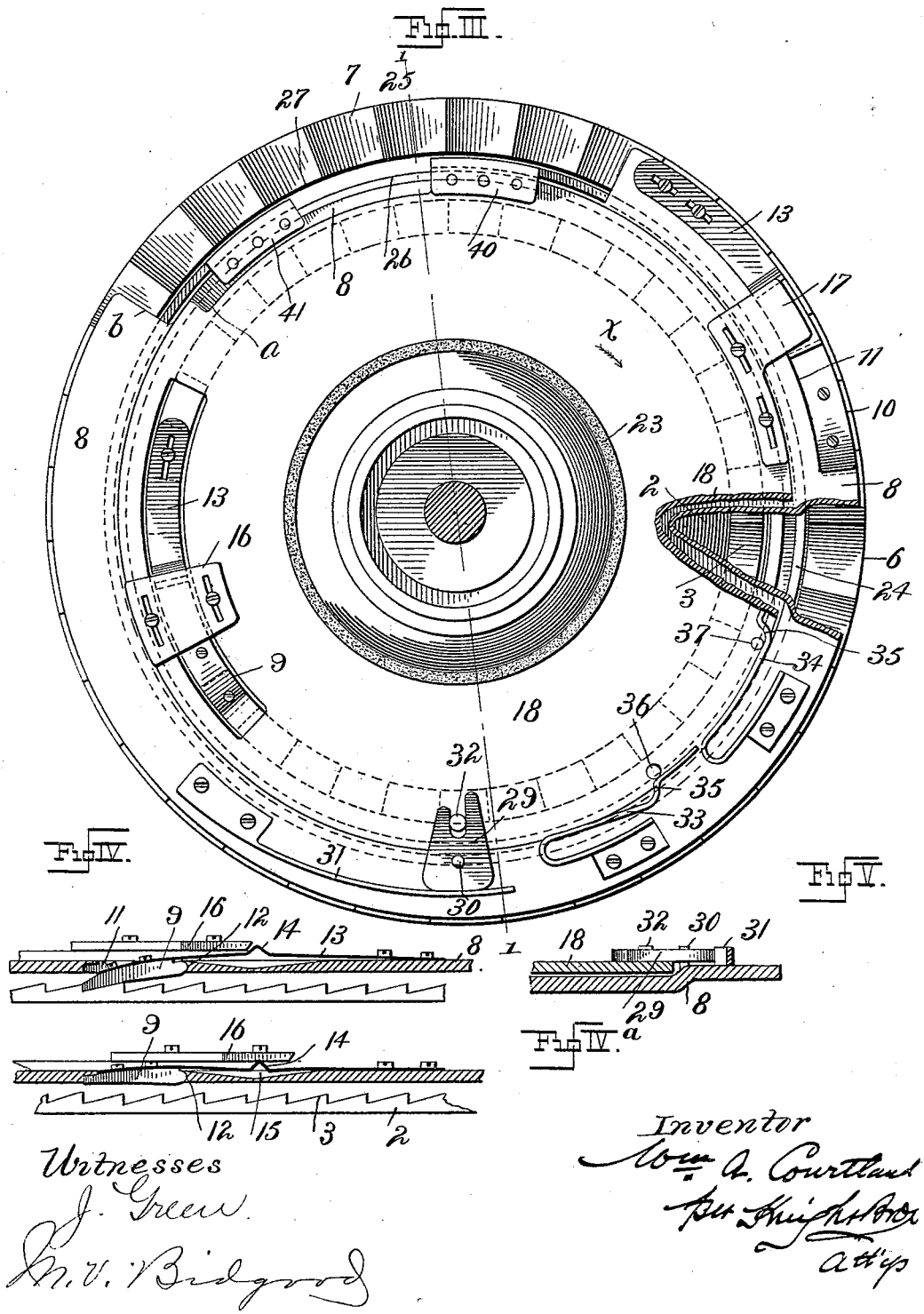

(No Model.) 5 Sheets—Sheet 3.
W. A. COURTLAND.
BICYCLE.
No. 520,728. Patented May 29, 1894.
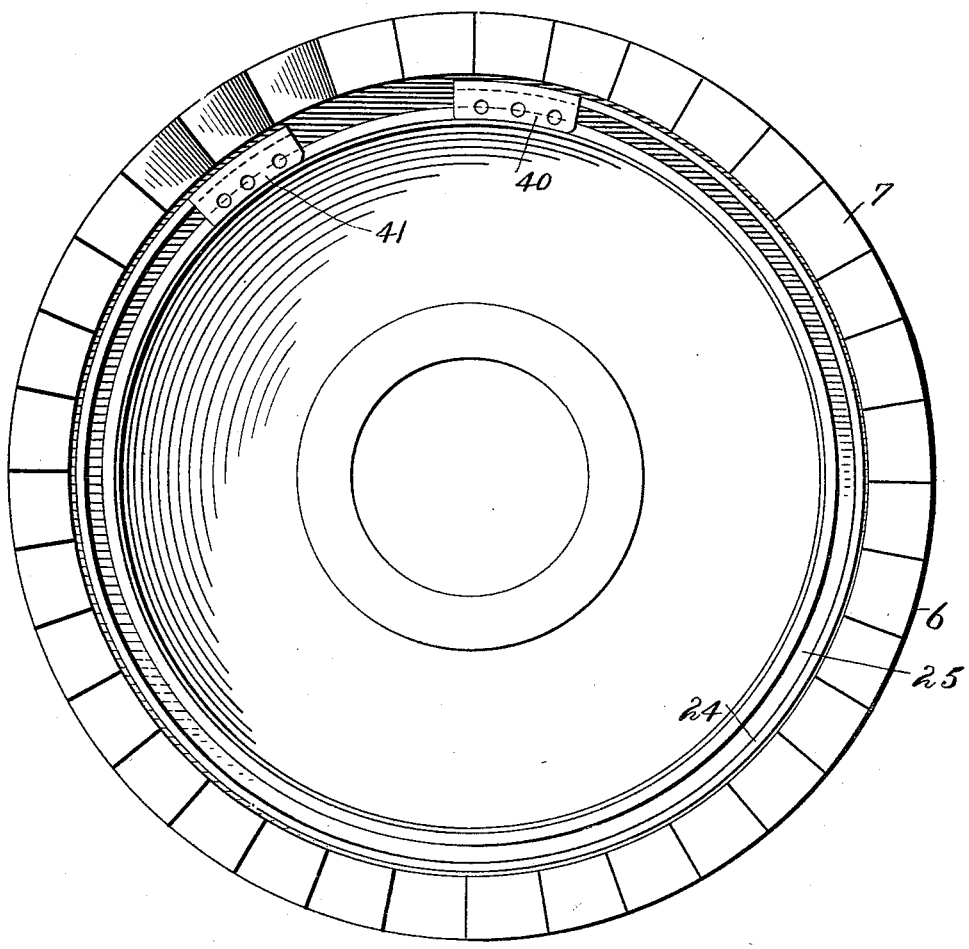
Fig. VI.
Witnesses
J. Green
M. V. Bidgood
Inventor
Wm. A. Courtland
per Knight Bros.
attys (No Model.)  5 Sheets—Sheet 4.
W. A. COURTLAND.
BICYCLE.
No. 520,728. Patented May 29, 1894.
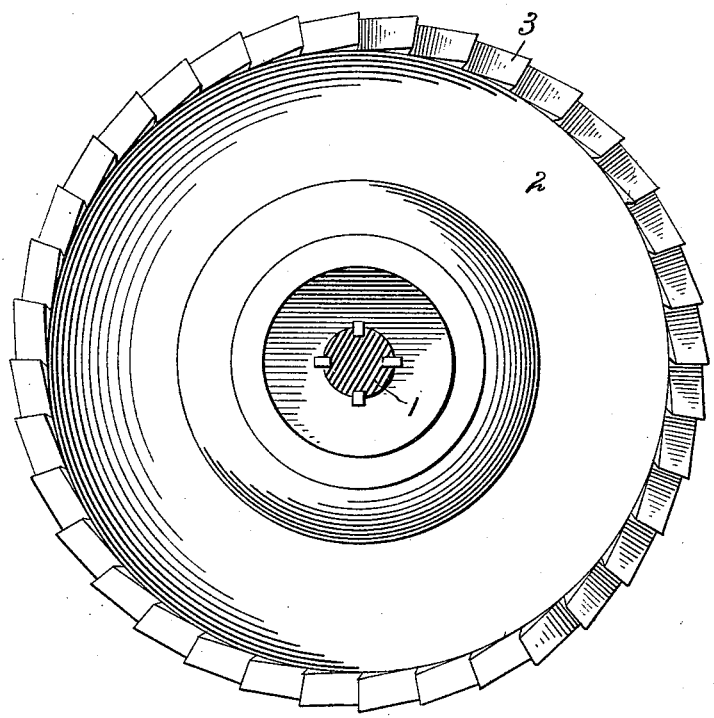
Fig. VII.

(No Model.) 5 Sheets—Sheet 5.
W. A. COURTLAND.
BICYCLE.
No. 520,728. Patented May 29, 1894.
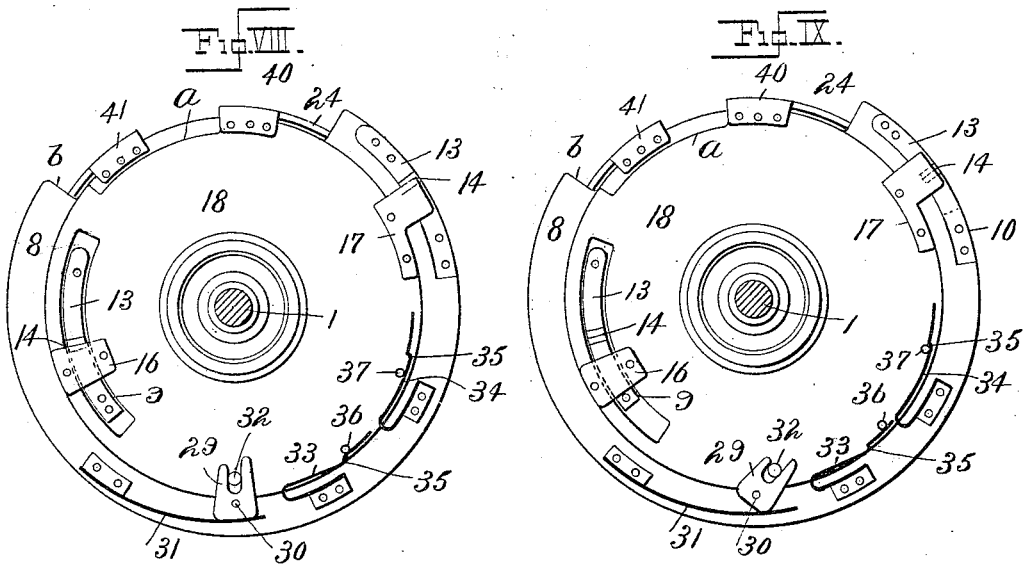
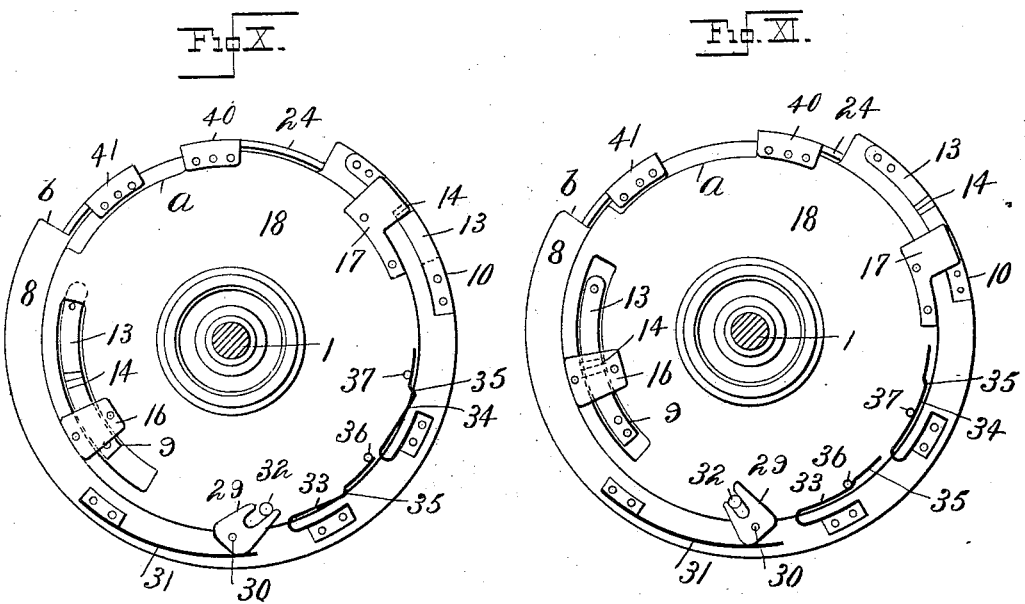
Witnesses
J. Green
M. V. Bidgood
Inventor
Wm. A. Courtland
per Knight Bros.
attys

UNITED STATES PATENT OFFICE.

WILLIAM A. COURTLAND, OF NEW YORK, N. Y.

BICYCLE.

SPECIFICATION forming part of Letters Patent No. 520,728, dated May 29, 1894.

Application filed March 12, 1894. Serial No. 503,250. (No model.)

*To all whom it may concern:*

Be it known that I, WILLIAM A. COURTLAND, a citizen of the United States, residing in the city, county, and State of New York, have invented certain new and useful Improvements in Bicycles, of which the following is a specification.

My invention relates to the driving and controlling mechanism of cycles of all descriptions, though I have in the main, had in view its application to bicycles, and specifically to what is known as the "Safety." Such machines are operated by treadles and cranks which communicate motion to the rear wheel by chain and sprocket wheels. In coasting on such machines, it is necessary to raise the feet from the treadles. The wheels are now generally made with pneumatic tires so that an ordinary brake, even if one be applied to the tire, is destructive and even dangerous in operation. Band brakes acting on the wheel hub and controlled by hand have been found inefficient and peripheral brakes are not only, as above pointed out, destructive of the tire, but involve, on "safeties" so complicated an array of levers and rods as to be very objectionable. The unsatisfactoriness of the braking devices and the surrender of control of the wheel therefore involved in the removal of the feet from the treadles, have produced a general condemnation of the practice of coasting which would be without foundation if the bicycle remained perfectly in the control of the rider at such times.

The object of my invention is to enable the control of the machine entirely by the feet which remain constantly on the treadles whether pedaling or coasting and not only propel the wheel but connect or disconnect the treadles from the wheel and apply or release the brake.

Referring to the accompanying drawings which form a part of this specification:—

Figure I is a vertical sectional view, on the line I—I, Fig. III, of a portion of a bicycle wheel embodying my invention. Fig. II is a face view of the same parts, part broken away. Fig. III is a similar view with the sprocket wheel, its anti-friction bearings and the protecting casing removed. Figs. IV and IV$^A$ are sectional detail views illustrating the operation of the dogs. Fig. V is a similar view of the centering lever. Fig. VI is a face view of the clutch disk. Fig. VII is a similar view of the stationary ratchet disk. Figs. VIII, IX, X and XI are face views of the operating disks and show their several defined positions.

1 is the axle of the driving wheel—usually the rear wheel—of a bicycle. It is, as usual, fastened rigidly to the frame (not shown) and it has, keyed to it and therefore held rigidly from revolution, a disk, 2. This disk 2, has on its outer face, near its periphery, an annular rack 3, whose teeth present their abrupt faces in direction to arrest a dog traveling in the direction of backward rotation of the wheel.

One end of the wheel hub is shown at 4 and its customary ball-bearing at 5. To the hub 4 is fixed the clutch-disk, 6, which has on its outer face near the periphery, an annular rack 7, whose teeth have their abrupt faces presented oppositely to those on disk 2; and this clutch disk has an annular recess 25, in which the clutch operates. Of the operating disks, 8 is the dog-carrying disk having two dogs 9 and 10 engaging respectively the two racks 3 and 7. The method of mounting these dogs is shown in Figs. IV and IV$^A$. For each dog the dog-carrying disk 8, has an aperture 11, rounded at one end to form a seat 12, for the rounded butt of the dog. A plate spring 13, bolted to the dog-carrying disk, 8, and to the dog secures the latter and causes it to engage the rack 3 or 7 as the case may be. The springs 13 are humped at 14 and the dog-carrying disk 8, is hollowed to receive the springs as shown at 15 in Fig. IV$^A$. The other operating disk 18 is the driving disk and has the pieces 16 and 17 rigidly secured to it. These pieces 16 and 17 are adapted, as hereinafter described, to move over the humps 14 of the springs 13 and disengage one or the other dog 9 or 10, as the case may be, from engagement with its rack. The dog-carrying-disk 8, is bolted or otherwise fixed to the sleeve 19 which forms a casing for the outer anti-friction bearing 30 and also forms a journal for the ring 28 which is attached to the driving sprocket-wheel 21, and also to the driving disk 18. A sheet-metal casing 22, is fixed to the clutch disk 6, and, with felt ring 23, on the driving disk 18, co-operates to exclude dust and dirt from the mechanism.

The steel band or clutch 24 lies in the recess 25, in the clutch disk 6 and operates against the walls 26 or 27 thereof. Part of the peripheries of the operating disks 8 and 18 are cut away as shown at *b*, as in Figs. VIII, IX, X and XI. One end 40 of the band 24 is united to the driving-disk 18, and the other end 41, to the dog-carrying disk 8. The centering lever 29 is simply for returning the operating disks 8 and 18 to a certain position called neutral and shown in Fig. VIII. It is pivoted at 30 to the dog-carrying disk 8 and its cam-shaped outer end bears against a spring 31, fixed to said disk. Its inner end is slotted to engage a stud 32, carried by the driving disk 18. Locking springs 33 and 34 are mounted on the disk 8 and have shoulders at 35 which engage with studs 36, 37 on disk 18 for the purposes hereinafter set forth.

The operation of the invention is as follows: In Fig. VIII, the operating disks are in the "neutral" position relatively to themselves; that is, the position they assume with relation to each other when there is no force applied to the treadle. The centering lever 29 forced by the spring 31, is the cause of the disks assuming this relative position which is called neutral because they have no operating effect. When these disks are neutral neither of the plates 16 or 17 on the driving disk 18 covers the hump 14, on the plate springs 13, under them. As a consequence both the dogs 9 and 10, project from the other side of the dog-carrying disk 8. Now, if the driving disk 18 be moved backward in the direction of the arrow *x*, Fig. III, the pin 32 operating through the centering lever 29, moves the dog-carrying disk 8, backward with it, maintaining their neutral position until the dog 9 is intercepted by a tooth of the rack 3 on the stationary disk 2 when the dog-carrying disk can no longer turn backward. The dog 10 simply slips backward on the rack 7 of the clutch disk 6. Should this clutch disk (with the wheel of the cycle) be revolved forward the dog 10 will drop down behind each tooth of the rack 7 making a noise. If the driving disk 18 moves still farther backward the pin 32 must move the centering lever which assumes, with the disks the position shown in Fig. IX. The pin 36 slides easily upon the spring 33 having no effect. The pin 37 slides easily upon the spring 34, until reaching its shoulder 35 which gives a decided resistance, notifying the wheelman and allowing him to rest his feet without too delicate a pressure or fear of passing this position. The clutching strap 24 is now about two-thirds the distance from the outer clutching surface 27, and about one-third from the inner. The plate 16 on the driving disk has moved away from the hump 14 of the spring under it. But the plate 17 has moved against, shoved down, and rides on top of the hump 14 on the corresponding spring 13 of dog 10. This causes the dog 10 to rise from the ratchet 7. This is more clearly understood by referring to Figs. IV and IV$^A$ in which Fig. IV shows the first or neutral position of either plate 16 or 17 and Fig. IV$^A$ the present position and effect of the plate. The dog 10, cannot now rattle when the ratchet 7 is moved forward by the rolling of the cycle wheel. Therefore this is called the silent coasting position. It is obvious that if enough back pressure is applied to the driving disk 18 the pin 37 will snap past the shoulder 35 on the spring 34, after which it slides easily into the position shown in Fig. X, called the braking position. Plate 17 is still farther from the hump 14, on the spring under it as shown in Fig. IV; while the plate 16 shown in Fig. IV$^A$ still holds the dog 9 up in the silent position. But the end 41 of the clutching band 24 carried by disk 8 has been forced so near to its other end which the dog 9 prevents from moving, as to clinch the band against the inner clutching surface 26, of the groove 25, in the clutch disk. Thus it acts as a simple band brake, the pressure depending upon the backward force received from the driving disk. Now, as soon as the braking pressure is sufficiently relieved the centering lever 29, brings these operating disks back again to the silent coasting position, Fig. IX. If the wheelman wishes to drive the machine forward, as he moves the treadles forward the driving disk 18 responds but the centering lever 29 does not move the dog-carrying-disk 8, until said centering lever has brought the operating disks into the neutral position, Fig. VIII, in which position it will be remembered both the dogs are ready to engage with their respective ratchets. If the driving wheel and the clutch disk 6, are revolving the dog 10, will click against its rack 7, and if the treadles and driving disk 18 be moved forward the pin 32 operating through the centering lever 29 moves the dog-carrying-disk, in the same direction, the dog 9 clicking against the ratchet 3, on the stationary disk 2. When the forward motion of the operating disks 8 and 18, causes the dog 10 to catch up with the motion of the clutch disk 6, said dog engages with a tooth of the clutch disk 6; said dog engages with a tooth of the rack 7. This retards the motion of the dog-carrying-disk 8, while the driving disk 18, may be still farther driven ahead till the operating disks are in the position shown in Fig. XI called the driving position. By this time the end 40 of the clutch band attached to the driving disk has been moved so far from the end 41 attached to disk 8 as to expand the band and clinch it against the outer clutching surface 27, when the driving disk 18 can revolve no faster than the clutch disk. When the operating disk is moved from the neutral position into the driving position, the plate 16, on the driving disk 18, depresses the hump 14, on the corresponding spring 13 and raises the dog 9, as shown in Fig. IV^A so that it will not click against the rack 3 on the stationary disk 2. Instead of the positively acting clutches having dogs engaging toothed pawls, herein shown and described, I may employ silent or friction clutches.

To carry the pedals over the dead-center, it is necessary to provide for any merely accidental dislodgment of the connection between the dog-carrying disk 8 and the clutch-disk 6 while pedaling. I therefore provide the stud 36 which when the disk 18 is shifted when starting to propel the machine is brought into engagement with a shoulder on the locking spring 33 of disk 8 so that the disks 8 and 18 are held sufficiently together to insure the carrying of the pedals over the dead-center. But the locking spring 33 is readily dislodged by a momentary pressure in back-pedaling for the purpose of beginning to apply the brake.

(I may remark that I adopt the term "disk" for certain parts merely as a short term conveying approximately the shape of such parts, which are however, in reality, preferably not flat disks, but circular dished pieces of metal centrally pierced for the passage of the axle 1.)

Having thus described my invention, the following is what I claim as new therein and desire to secure by Letters Patent:

1. In a bicycle or other cycle, the combination of the treadles, the driving wheel, a braking wheel or disk, and a clutch operated by the treadle and adapted to be placed by pressure on said treadle in connection with either the driving wheel or said brake-disk or wheel, substantially as set forth.

2. In a bicycle or other cycle, the combination of the treadles, a driving disk or member operated thereby, a clutch disk or member connected to the driving wheel, a braking disk or member and a band brake operated by said driving disk or member and having means for connecting it with said clutch disk or said brake disk and applying thereby driving or braking pressure, substantially as and for the purposes set forth.

3. In a bicycle or other cycle, the combination of the driving sprocket wheel or member 21, the driving disk 18 connected thereto, the dogs the dog-carrying-disk 8, the clutch-disk 6, the braking disk 2 connected to the wheel axle and the band brake 24 and having its opposite ends connected to its disks 18 and 8 and arranged and adapted to operate substantially as and for the purposes set forth.

4. In a bicycle or other cycle, the combination of the driving wheel or member 21, the driving disk 18, the dogs the dog-carrying-disk 8, clutch-disk 6, the braking disk 2, the band brake 24 connected to said disks 18 and 8 as set forth and the dog-operating plate 17 carried by disk 18.

5. In a bicycle or other cycle, the combination of the driving wheel or member 21, the driving disk 18 connected thereto, the dog-carrying-disk 8, the clutch-disk 6, the brake disk 2, the band brake 24, the dogs 9, 10 having springs 13, 14 and the dog-operating plates 16, 17 mounted on said disk 18 and arranged and adapted to operate substantially as set forth.

6. In a bicycle or other cycle, the combination of the disks 8 and 18 and 6, the band brake 24 having its ends connected to said disks 8 and 18 and the spring-returning lever 29 arranged and adapted to operate, substantially as set forth.

7. In a bicycle or other cycle, the combination of the disks 8 and 18, a clutch and brake mechanism operated thereby, the spring 33 and stud 36, arranged and adapted to operate, substantially as set forth.

8. In a bicycle or other cycle, the combination of the disks 8 and 18, a clutch and brake mechanism operated thereby, the spring 34 and stud 37 arranged and adapted to operate, substantially as set forth.

WM. A. COURTLAND.

Witnesses:
R. I. BROWN,
M. V. BIDGOOD.